(12) United States Patent
Nakagomi

(10) Patent No.: US 8,295,609 B2
(45) Date of Patent: Oct. 23, 2012

(54) IMAGE PROCESSING APPARATUS, IMAGE PROCESSING METHOD AND COMPUTER READABLE-MEDIUM

(75) Inventor: Kouichi Nakagomi, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 272 days.

(21) Appl. No.: 12/857,761

(22) Filed: Aug. 17, 2010

(65) Prior Publication Data

US 2011/0052070 A1   Mar. 3, 2011

(30) Foreign Application Priority Data

Aug. 31, 2009   (JP) ................ P2009-199675

(51) Int. Cl.
*G06K 9/48* (2006.01)
*G06K 9/34* (2006.01)
(52) U.S. Cl. ......... 382/199; 382/180; 382/205; 382/224
(58) Field of Classification Search .................. 382/173, 382/180, 199, 205, 224
See application file for complete search history.

(56) References Cited

U.S. PATENT DOCUMENTS

| 6,701,010 | B1 | 3/2004 | Katsuyama | |
|---|---|---|---|---|
| 6,990,235 | B2 | 1/2006 | Katsuyama | |
| 7,330,589 | B2 | 2/2008 | Watanabe | |
| 2011/0085735 | A1* | 4/2011 | Malik | ............ 382/199 |

FOREIGN PATENT DOCUMENTS

| CN | 1234569 A | 11/1999 |
|---|---|---|
| JP | 11-288465 A | 10/1999 |
| JP | 2005-149439 A | 6/2005 |

OTHER PUBLICATIONS

Japanese Office Action dated Jun. 28, 2011 and English translation thereof in counterpart Japanese Application No. 2009-199675.
L. Itti et al; Short Papers; A Model of Saliency-Based Visual Attention for Rapid Scene Analysis; IEEE Transactions on Pattern Analysis and Machine Intelligence; vol. 20, No. 11, Nov. 1998.
Chinese Office Action dated Jun. 1, 2012 (and English translation thereof) in counterpart Chinese Application No. 201010267945.1.

* cited by examiner

*Primary Examiner* — Aaron W Carter
(74) *Attorney, Agent, or Firm* — Holtz, Holtz, Goodman & Chick, PC

(57) ABSTRACT

There is provided an image processing apparatus. The image processing apparatus includes: an obtaining unit configured to capture an image; a specifying unit configured to specify at least one pixel on an edge of the image; a tracking unit configured to track pixels that are similar to the at least one pixel, among peripheral pixels around the at least one pixel; and an estimating unit configured to estimate, as a region of interest, a region other than a region consisting of the pixels tracked by the tracking unit.

5 Claims, 5 Drawing Sheets

F2(F1)

Pix (i, j)

F2(F1)     A

IMAGE PROCESSING APPARATUS, IMAGE PROCESSING METHOD AND COMPUTER READABLE-MEDIUM

CROSS-REFERENCE TO RELATED APPLICATION

This application claims priority from Japanese Patent Application No. 2009-199675, filed on Aug. 31, 2009, the entire contents of which are hereby incorporated by reference.

BACKGROUND

1. Technical Field

The present invention relates to an image processing apparatus, an image processing method, and a computer readable-medium.

2. Related Art

In the field of image processing, a technology has been known which detects a specific region as a region of interest (ROI) from an image to be processed by generating a plurality of feature maps representing physical features obtained from the image and integrating them.

As a more concrete method, for example, according to Treisman's feature integration theory, a plurality of feature maps are integrated to obtain a saliency map. According to the theory of Itti, Koch et al., feature maps are each normalized by the square error from the average value of each, and all the feature maps are integrated by the linear combination method. Then, the integrated feature map is recursively filtered by a difference-of-Gaussian filter, and a local peak of the finally obtained filtering result is extracted as a region of interest (see, for example, Non-patent Reference 1).

For the plurality of feature maps used by the above-mentioned theories, it is considered typical to use the nature of paying attention with higher priority to a visually salient object in the initial stage of the human viewing process such as high lightness, a specific color or high contrast.

[Non-patent Reference 1] Laurent Itti, Christof Koch, and Ernst Neibur, "A Model of Saliency-Based Visual Attention for Rapid Scene Analysis", IEEE TRANSACTIONS ON PATTERN ANALYSIS AND MACHINE INTELLIGENCE, (U.S.A.), IEEE Computer Society, November 1998, Vol. 20, Number 11, pp. 1254-1259

However, although the region of interest (ROI) detection methods based on the above-mentioned theories are considered effective at detecting the feature of each individual image region in an image to be processed, the methods do not consider detecting the feature of each individual image region in consideration of information that the image to be processed, as a whole, has (for example, a composition).

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an illustrative aspect of the present invention to provide an image processing apparatus, an image processing method and a computer readable-medium, capable of detecting a region of interest from an image in consideration of a composition.

According to one or more illustrative aspects of the present invention, there is provided an image processing apparatus. The apparatus includes: an obtaining unit configured to obtain an image; a specifying unit configured to specify at least one pixel on an edge of the image; a tracking unit configured to track pixels that are similar to the at least one pixel, among peripheral pixels around the at least one pixel; and an estimating unit configured to estimate, as a region of interest, a region other than a region consisting of the pixels tracked by the tracking unit.

According to one or more illustrative aspects of the present invention, there is provided an image processing method. The method includes: (a) obtaining an image; (b) specifying at least one pixel on an edge of the image; (c) tracking pixels that are similar to the at least one pixel, among peripheral pixels around the at least one pixel; and (d) estimating, as a region of interest, a region other than a region consisting of the tracked pixels.

According to one or more illustrative aspects of the present invention, there is provided a computer-readable medium. The computer-readable medium stores a program for causing the computer to perform operations including: (a) obtaining an image; (b) specifying at least one pixel on an edge of the image; (c) tracking pixels that are similar to the at least one pixel, among peripheral pixels around the at least one pixel; and (d) estimating, as a region of interest, a region other than a region consisting of the tracked pixels.

DETAILED DESCRIPTION OF EXEMPLARY EMBODIMENTS

Figure 1:
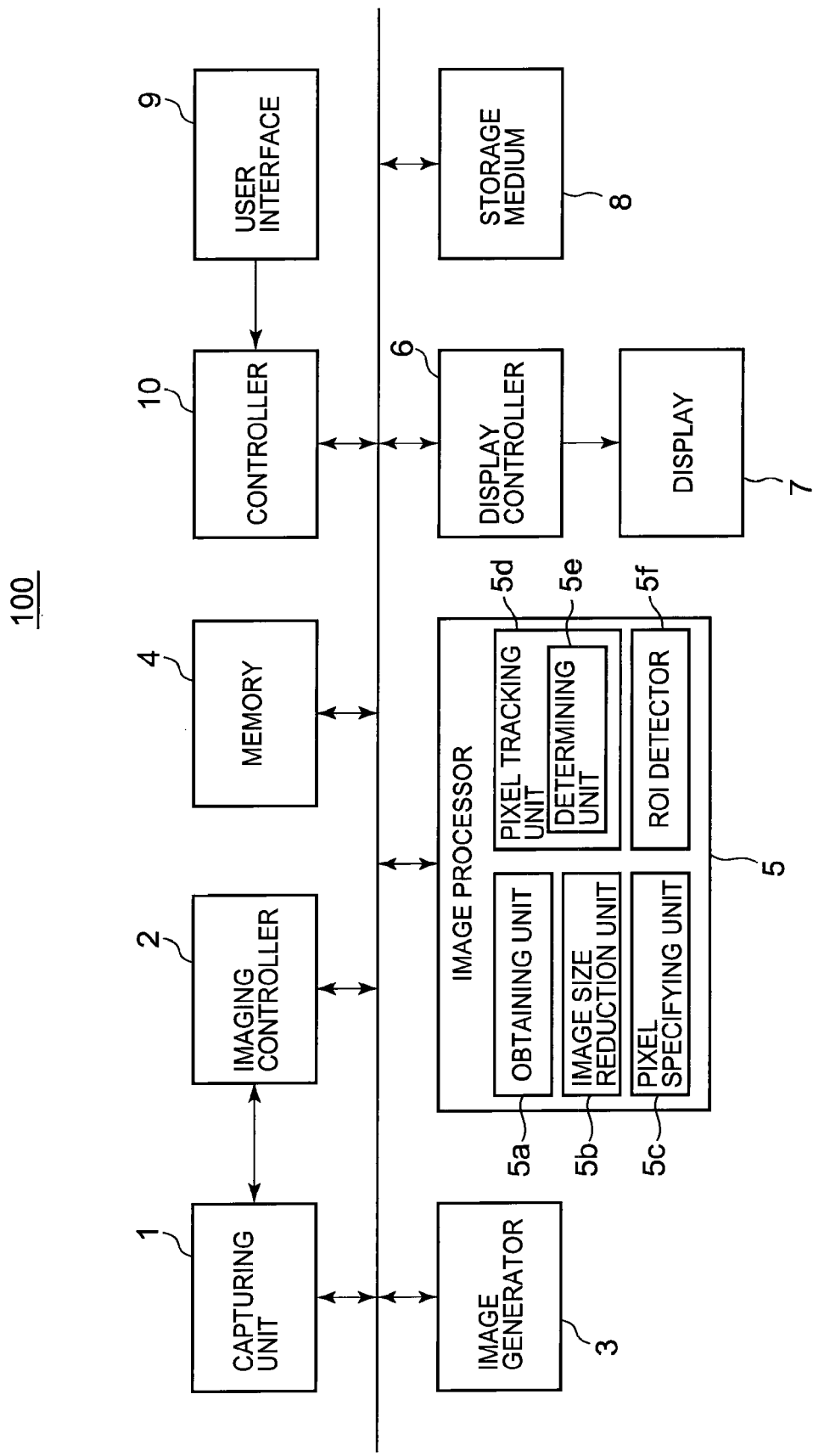
FIG. 1 is a block diagram showing an imaging apparatus according to an embodiment of the present invention.

Hereinafter, exemplary embodiments of the present invention will be now described with reference to the drawings. It should be noted that the scope of the invention is not limited to the illustrated example. FIG. 1 is a block diagram showing an imaging apparatus 100 according to an embodiment of the present invention.

According to the exemplary embodiment of the present invention, the imaging apparatus 100 includes: a capturing unit configured to capture an image; a specifying unit configured to specify at least one pixel on an edge of the image; a tracking unit configured to track pixels that are similar to the at least one pixel, among peripheral pixels around the at least one pixel; and an estimating unit configured to estimate, as a region of interest, a region other than a region consisting of the pixels tracked by the tracking unit.

Specifically, as shown in FIG. 1, the imaging apparatus 100 includes: a capturing unit 1; an imaging controller 2; an image generator 3; a memory 4; an image processor 5; a display controller 6; a display 7; a storage medium 8; an user interface 9; and a controller 10.

The capturing unit 1 captures a subject image and generates an image frame. Specifically, although not shown, the capturing unit 1 includes: a lens unit including a plurality of lenses such as a zoom lens and a focus lens; a diaphragm that adjusts the amount of light passing through the lens unit; and an image sensor such as a CCD (charge coupled device) or a CMOS (complementary metal-oxide semiconductor), and is provided with an electronic capturing unit that converts the optical image passing through the lenses of the lens unit, into a two-dimensional image signal.

The imaging controller 2 includes, although not shown, a timing generator and a driver. The imaging controller 2 scans and drives the electronic capturing unit by the timing generator and the driver to cause the electronic capturing unit to convert an optical image into a two-dimensional image signal at predetermined intervals, reads an image frame on a screen-by-screen basis from an image capturing region of the electronic capturing unit, and outputs it to the image generator 3.

The imaging controller 2 also performs AE (automatic exposure processing), AF (automatic focusing processing), AWB (automatic white balance) and the like as image capturing condition adjusting control.

The image generator 3 performs gain adjustment as appropriate for each of the color components of R, G and B on an analog signal of the image data transferred from the electronic capturing unit, sample-holds the signal by a sample-holding circuit (not shown), converts it into digital data by an A/D converter (not shown), performs color process processing including pixel interpolation and gamma correction by a color process circuit (not shown), and generates digital brightness signal Y and color difference signals Cb and Cr (image data in the YUV color space).

The brightness signal Y and the color difference signals Cb and Cr outputted from the color process circuit are DMA-transferred to the memory 4 used as a buffer memory, through a non-illustrated DMA controller.

The memory 4 is, for example, a DRAM, and temporarily stores data to be processed by the image processor 5, the controller 10 and the like.

The image processor 5 includes an obtaining unit 5a that obtains an image F1 captured by the capturing unit 1, as an image to be processed.

Specifically, the obtaining unit 5a acquires, for example, the YUV data of the image F1 generated by the image generator 3 when a live view image or a recording image is acquired.

The image processor 5 further includes an image size reduction unit 5b that generates a reduced-size image F2 reduced at a predetermined ratio both horizontally (x axis) and vertically (y axis) based on the YUV data of the image F1 obtained by the obtaining unit 5a.

The image size reduction unit 5b performs, for example, filtering using a predetermined filter (for example, a Gaussian filter) on the obtained YUV data of the image F1 to thereby generate the reduced-size image F2 consisting of predetermined pixels horizontally (x axis) and vertically (y axis) (for example, 40×30 [x axis×y axis] pixels). While a reduced-size image F2 consisting of 54×40 (x axis×y axis) pixels is illustrated in FIGS. 3A, 3B, 5A and 5B, this is merely an example, and the present invention is not limited thereto.

The image size reduction unit 5b is configured to generate the reduced-size image F2 of the image F1 obtained by the obtaining unit 5a.

The image processor 5 further includes a pixel specifying unit 5c that specifies at least one pixel on the edge of the reduced-size image F2 generated by the image size reduction unit 5b.

Specifically, the pixel specifying unit 5c specifies the pixels Pix(0,0), Pix(x,0), Pix(0,y) and Pix(x,y) on the four corners of the reduced-size image F2 as peripheral pixels Pix(i,j) (x and y are real numbers depending on the number of pixels of the reduced-size image F2).

While the pixels in the four corners of the reduced-size image F2 are specified as the peripheral pixels Pix (i,j), the present invention is not limited thereto. A pixel in any position may be specified as long as it is on the edge of the reduced-size image F2. Moreover, it is not always necessary to specify the pixels in all of the four corners of the reduced-size image F2. It is necessary to specify the pixel in at least one corner as the peripheral pixel Pix(i,j).

The pixel specifying unit 5c is configured to specify at least one pixel on the edge of the image F1 obtained by the obtaining unit 5a.

The image processor 5 further includes a pixel tracking unit 5d that tracks a pixel similar to the peripheral pixel Pix(i,j) with respect to the peripheral region of the pixel (peripheral pixel Pix(i,j)) at least in one corner among the pixels in the four corners of the reduced-size image F2 specified by the pixel specifying unit 5c.

That is, the pixel tracking unit 5d includes a determining unit 5e that determines whether or not the degree of coincidence between the pixel value of one pixel specified as the peripheral pixel Pix(i,j) by the pixel specifying unit 5c and the pixel value of a peripheral pixel of the one pixel is not less than a threshold value. The pixel value is the color information (the value of each component) of each pixel expressed by a predetermined color space such as the RGB color space, the HSV color space or the YUV color space. The pixel tracking unit 5d tracks the pixel whose degree of coincidence is determined to be not less than the threshold value by the determining unit 5e, as the pixel similar to the peripheral pixel Pix(i,j).

Figure 4:
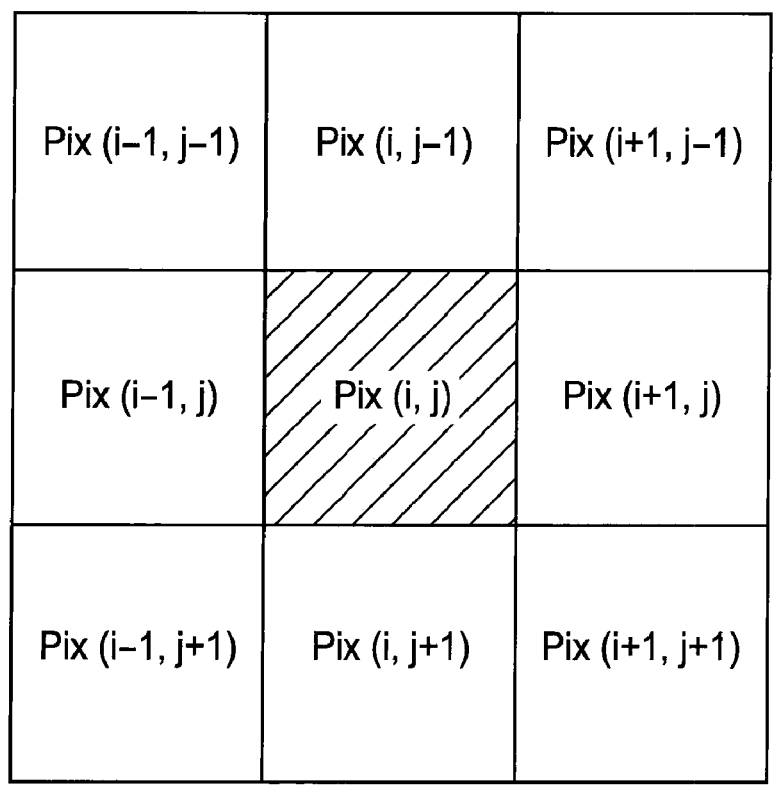
FIG. 4 is a view for explaining a tracking region in the region of interest estimation processing.

Specifically, the pixel tracking unit 5d sets, as the tracking range, eight adjacent to pixels Pix(i−1,j−1), Pix(i, j−1), Pix(i+1,j−1), Pix(i−1,j), Pix(i+1, j), Pix(i−1,j+1), Pix(i,j+1) and Pix(i+1,j+1) of the peripheral pixel Pix(i, j) specified by the pixel specifying unit 5c (see FIG. 4). Then, with the pixels in the tracking range as the target pixels of the pixel value comparison determination, the pixel tracking unit 5d calculates, for example, the L2 norm between the pixels as the degree of coincidence, and determines whether the pixel values are close or not by the determining unit 5e.

Figure 3A:
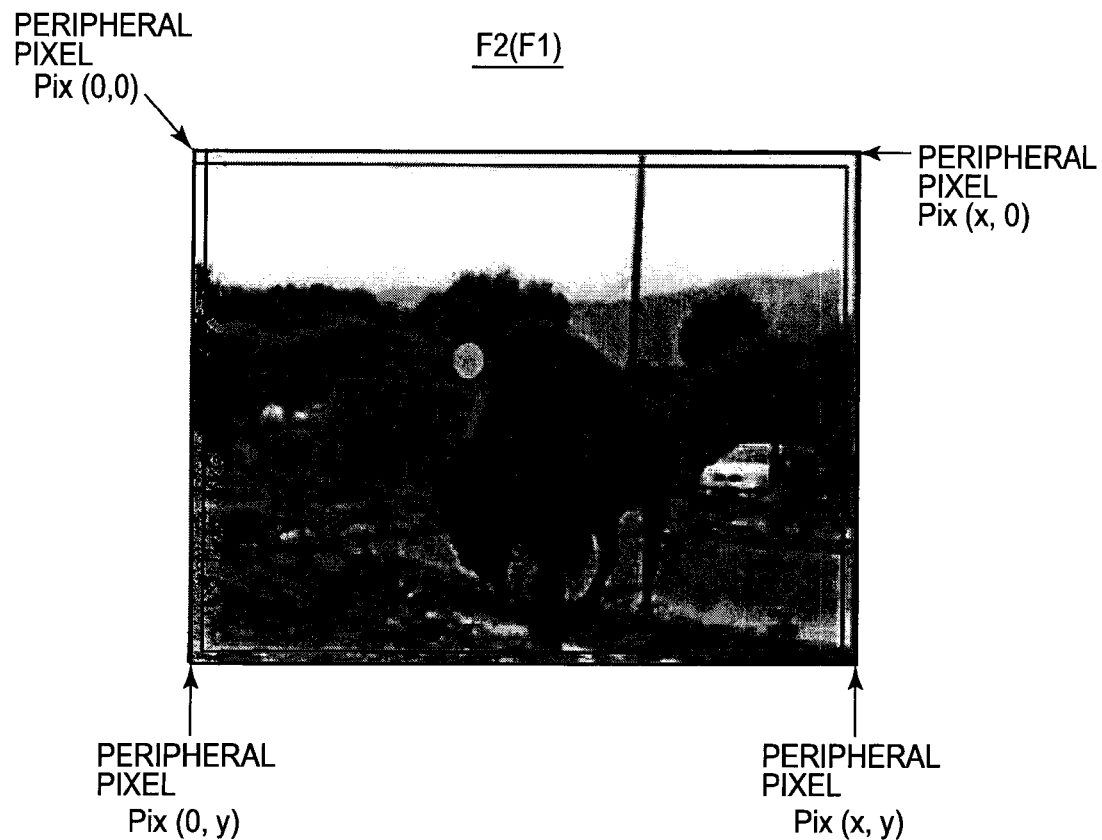
FIGS. 3A and 3B are views for explaining the region of interest estimation processing.
Figure 3B:
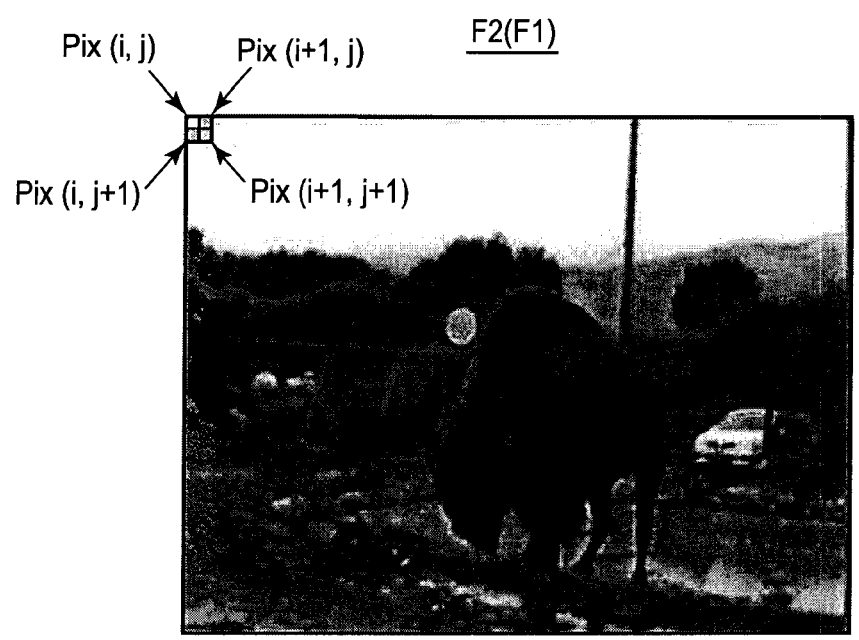

For example, as shown in FIG. 3B, when the pixel Pix(0,0) in the upper left corner is the peripheral pixel Pix(i,j), the pixel tracking unit 5d sets adjacent pixels Pix(i+1,j), Pix(i,j+1) and Pix(i+1,j+1) as the target pixels of the comparison determination. Then, the pixel tracking unit 5d converts the image data in the YUV color space into image data in the RGB color space according to a predetermined conversion formula, and then, compares the pixel values of the pixels by the determining unit 5e according to an expression (1) shown below. Then, the pixel tracking unit 5d determines the pixel satisfying the expression (1) (pixel whose degree of pixel value coincidence is not less than the threshold value) as the pixel similar to the peripheral pixel Pix(i,j), and tracks it.

$$|P_R(i,j)-P_R(i-1)|+|P_G(i-1,j-1)|+|P_B(i,j)-P_B(i-1,j-1)| < Th1 \quad (1)$$

Here, $P_R$ is the value of the R component of each pixel expressed by the RGB color space, $P_G$ is the value of the G component of each pixel expressed by the RGB color space, and $P_B$ is the value of the B component of each pixel expressed by the RGB color space. Th1 is a threshold value for determining whether the colors of the current target pixel and the adjacent pixel are close to each other or not, and may be changed as appropriate according to the tracking accuracy.

At this time, the color of a pixel whose pixel value is different from the pixel value of the peripheral pixel Pix(i,j) by not less than the threshold value is too different from the color of the peripheral pixel Pix(i,j), and it is assumed impossible to track such a pixel by the pixel tracking unit 5d. Therefore, it is desirable to exclude pixels whose pixel values are different from the pixel value of the peripheral pixel Pix(i,j) by not less than the threshold value according to the following expression (2):

$$(P_R(0,0)-P_R(i-1,j-1))+(P_G(0,0)-P_G(i-1,j-1))+(P_B(0,0)-P_B(i-1,j-1))<Th2 \qquad (2)$$

Here, Th2 is a threshold value for excluding the pixels whose colors are too different from the color of the peripheral pixel Pix(i,j), and may be changed as appropriate according to the tracking accuracy.

The pixel tracking unit 5d sets, as the new tracking range, eight adjacent pixels around a tracked pixel (for example, an adjacent pixel Pix(i+1,j)) tracked as the pixel similar to the peripheral pixel Pix(i,j) (the pixel whose degree of pixel value coincidence is not less than the threshold value) in the tracking range. Then, the pixel tracking unit 5d determines whether or not the pixel value of each pixel (the peripheral pixel of Pix(i+1,j)) in the new tracking range is close to the pixel value of Pix(i+1,j) similarly to the above by the determining unit 5e.

Figure 5A:
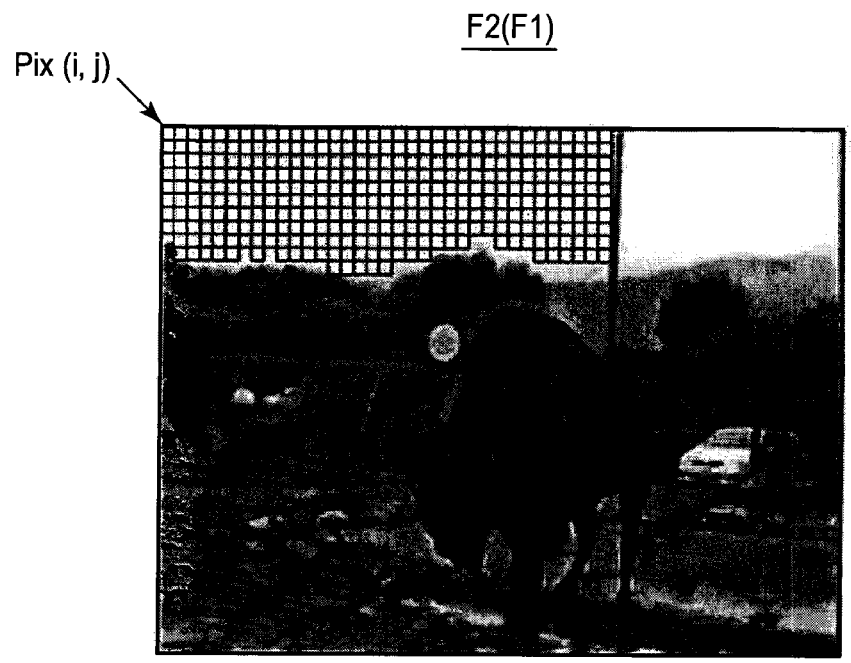
FIGS. 5A and 5B are views for explaining the region of interest estimation processing.
Figure 5B:
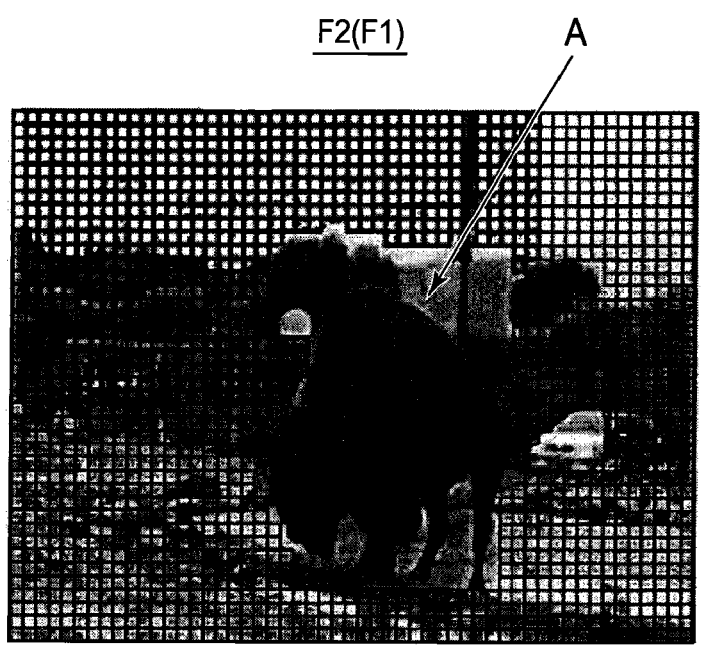

By repeatedly performing the above-described processing, the pixel tracking unit 5d successively sets a new tracking range based on the tracked pixel tracked as the pixel similar to the peripheral pixel Pix(i,j), and successively tracks pixels (see FIGS. 5A and 5B).

The pixel tracking unit 5d is configured to track pixels that are similar to the at least one pixel, among peripheral pixels around the at least one pixel.

The image processor 5 further includes a ROI detector 5f that estimates and detects a region of interest A from the reduced-size image F2 based on the result of the tracking by the pixel tracking unit 5d.

Specifically, for example as shown in FIG. 5B, the ROI detector 5f estimates an region (for example, in FIG. 5B, mainly the region where the buffalo exists) other than the region consisting of a plurality of pixels (in FIG. 5B, the pixels represented by the squares) tracked by the pixel tracking unit 5d in the reduced-size image F2, to be the region of interest A. Then, the ROI detector 5f enlarges the estimated region of interest A at a ratio corresponding to the ratio of reduction by the image size reduction unit 5b both horizontally (x axis) and vertically (y axis) so as to be associated with the image F1 obtained by the obtaining unit 5a.

That is, a region consisting of pixels located closer to the edge in an image is an region outside sight such as the sky or the ground and is highly likely an image having a low degree of attention from the user. Therefore, a region other than the tracked pixels in the image can be estimated to be the region of interest A having a high degree of attention from the user.

The ROI detector 5f is configured to estimate, as the region of interest A, the region other than the region consisting of the pixels tracked by the pixel tracking unit 5d.

The display controller 6 performs a control to read image data for display temporarily stored in the memory 4 and display it on the display 7.

Specifically, the display controller 6 includes a VRAM, a VRAM controller, a digital video encoder and the like. The digital video encoder periodically reads, from the VRAM through the VRAM controller, the brightness signal Y and the color difference signals Cb and Cr read from the memory 4 and stored in the VRAM (not shown) under the control of the controller 10, generates a video signal based on these pieces of data, and outputs it to the display 7.

The display 7 is, for example, a liquid crystal display, and displays, on the display screen, an image captured by the electronic capturing unit based on the video signal from the display controller 6. Specifically, the display 7 displays a live view image while successively updating, at a predetermined frame rate, a plurality of image frames generated by image captured by the capturing unit 1 in a still image mode or in a moving image mode. The display 7 also displays an image (rec view image) recorded as a still image, and displays an image being recorded as a moving image.

The storage medium 8 is, for example, a nonvolatile memory (flash memory), and stores still image data for recording coded in a predetermined compression format by a coding unit (not shown) of the image processor 5 and moving image data consisting of a plurality of image frames.

The user interface 9 is configured to receive operation signals for operating the imaging apparatus 100. Specifically, the user interface 9 includes a shutter button for receiving image shooting instructions, a selection enter button for receiving instructions as to selection of image modes, functions and the like, and a zoom button for receiving instructions as to zoom amount adjustment (all are not shown), and outputs a predetermined operation signal in response to an operation of these buttons, to the controller 10.

The controller 10 controls respective units in the imaging apparatus 100. Specifically, the controller 10 includes a CPU (not shown), and performs various control operations according to various processing programs (not shown) for the imaging apparatus 100.

Next, the region of interest estimation processing executed by the image processor 5 when a subject image is captured by the imaging apparatus 100 will be now described with reference to FIG. 2A to FIG. 5B.

Figure 2:
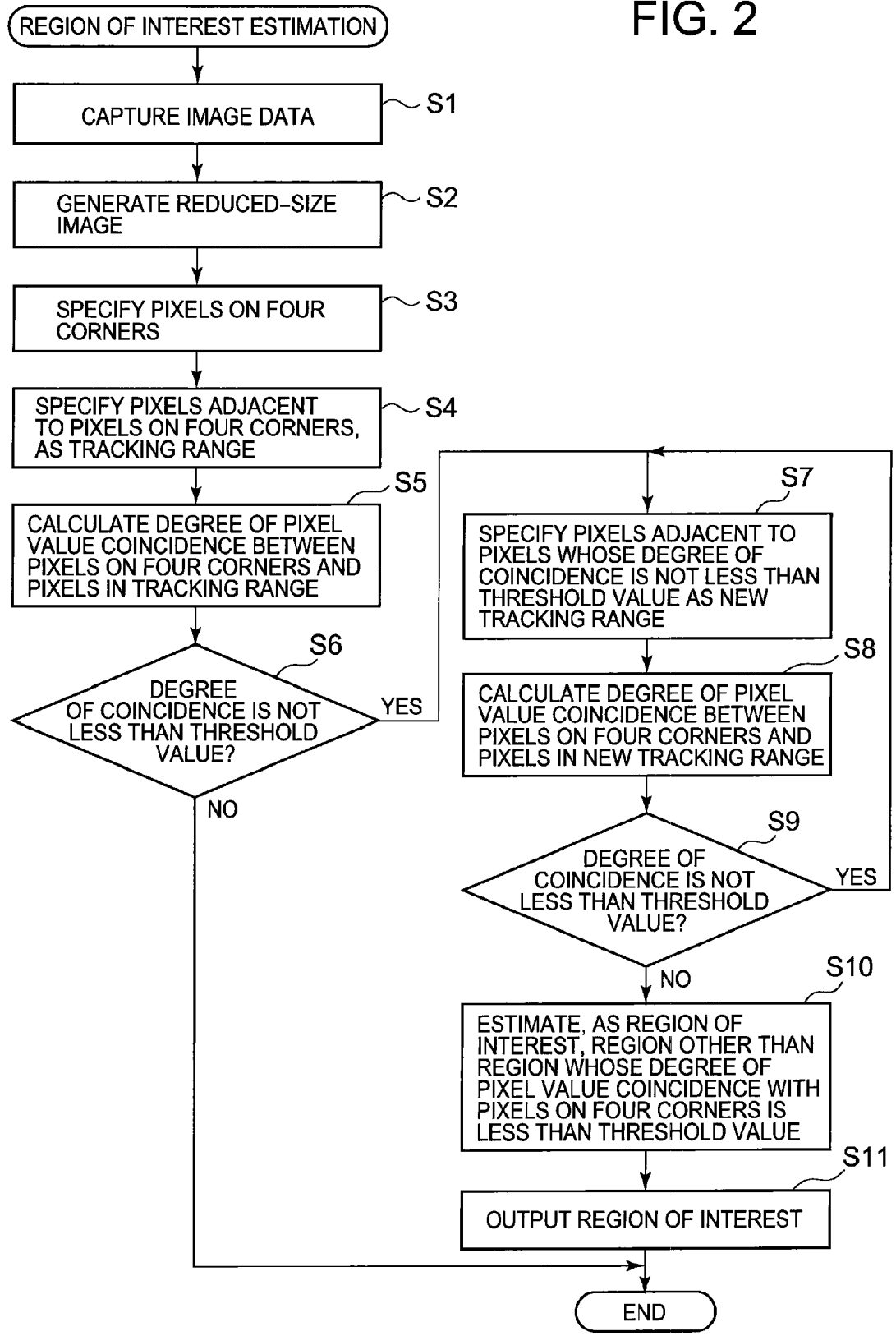
FIG. 2 is a flowchart showing an example of an operation associated with a region of interest estimation processing by the imaging apparatus of FIG. 1.

FIG. 2 is a flowchart showing an example of the operation associated with the region of interest estimation processing.

As shown in FIG. 2, the obtaining unit 5a obtains image data in the YUV space of the image F1 generated by the image generator 3, for example, by receiving a live view image or a recording image by the capturing unit 1 (step S1). Then, the image size reduction unit 5b generates the reduced-size image F2 reduced at a predetermined ratio both horizontally (x axis) and vertically (y axis), for example, by performing predetermined filtering using a predetermined filter (for example, a Gaussian filter) on the YUV data of the image F1 (step S2).

Then, the pixel specifying unit 5c specifies, as peripheral pixels Pix(i,j), the pixels Pix(0,0), Pix(x,0), Pix(0,y) and Pix(x,y) in the four corners of the reduced-size image F2 generated by the image size reduction unit 5b (step S3). Here, x and y are real numbers defined according to the number of pixels of the reduced-size image F2.

Then, the pixel tracking unit 5d identifies, as the tracking range, eight adjacent pixels Pix(i−1,j−1), Pix(i, j−1), Pix(i+1,j−1), Pix(i−1,j), Pix(i+1, j), Pix(i−1,j+1), Pix(i,j+1) and Pix(i+1,j+1) of the peripheral pixels Pix(i,j) specified by the pixel specifying unit 5c (step S4).

Then, the pixel tracking unit 5d sets the pixels in the tracking range as the target pixels of the pixel value comparison determination. Then, after converting the image data in the YUV color space into the image data in the RGB color space according to a predetermined conversion formula, the pixel tracking unit 5d calculates, for example, the L2 norm between the pixels as the degree of pixel value coincidence between the pixels Pix(0,0), Pix(x,0), Pix(0,y) and Pix(x,y) in the four corners of the reduced-size image F2 and the target pixels of the comparison determination (step S5). Then, the determining unit 5e of the pixel tracking unit 5d compares the pixel values of the pixels according to the following expressions (3) and (4) to thereby determine whether the degree of pixel value coincidence is not less than the threshold value or not (step S6):

$$|P_R(i,j)-P_R(i-1,j-1)|+|P_G(i-1,j-1)|+|P_B(i,j)-P_B(i-1,j-1)|<Th1 \quad (3)$$

$$(P_R(0,0)-P_R(i-1,j-1))+(P_G(0,0)-P_G(i-1,j-1))+P_B(0,0)-P_B(i-1,j-1))<Th2 \quad (4)$$

When it is determined at step S6 that the degree of pixel value coincidence is not less than the threshold value (step S6: YES), that is, when the expressions shown above are satisfied and it is determined that the degree of pixel value coincidence is not less than the threshold value, the pixel tracking unit 5d sets pixels similar to the peripheral pixel Pix(i,j), that is, all the pixels whose degree of pixel value coincidence is not less than the threshold value (for example, the adjacent pixels Pix(i+1,j)) as tracked pixels, and specifies eight adjacent pixels around the tracked pixels as the new tracking range (step S7).

Then, the pixel tracking unit 5d sets the pixels in the new tracking range as the target pixels of the pixel value comparison determination, and calculates, for example, the L2 norm between the pixels as the degree of coincidence between the pixel values of the pixels Pix(0,0), Pix(x,0), Pix(0,y) and Pix(x,y) on the four corners of the reduced-size image F2 and the pixel values of the target pixels of the comparison determination in the new tracking range similarly to the above (step S8). Then, the determining unit 5e of the pixel tracking unit 5d compares the pixel values of the pixels according to the above expressions (3) and (4) to thereby determine whether the degree of pixel value coincidence is not less than the threshold value or not (step S9).

When it is determined at step S9 that the degree of pixel value coincidence is not less than the threshold value (step S9: YES), that is, when the expressions shown above are satisfied and it is determined that the degree of pixel value coincidence is not less than the threshold value, the process shifts to step S7, and step 7 and subsequent steps are executed.

Step 7 and subsequent steps are repeatedly performed until it is determined at step S9 that the degree of pixel value coincidence between the target pixels of the comparison determination in the new tracking range and the corresponding pixels Pix(0,0), Pix(x,0), Pix(0,y) and Pix(x,y) in the four corners of the reduced-size image F2 is less than the threshold value (step S9: NO). By doing this, the pixel tracking unit 5d successively sets a new tracking range based on the tracked pixels tracked as pixels similar to the peripheral pixels Pix(i,j) (see FIGS. 5A and 5B).

Then, when it is determined at step S9 that the degree of pixel value coincidence with the target pixels of the comparison determination in the new tracking range is less than the threshold value (step S9: NO), the ROI detector 5f estimates the region other than the region consisting of the pixels (in FIG. 5B, the pixels represented by the squares) whose degree of pixel value coincidence with the pixels Pix(0,0), Pix(x,0), Pix(0,y) and Pix(x,y) in the four corners of the reduced-size image F2 is not less than the threshold value, to be the region of interest A (step S10).

Then, the ROI detector 5f outputs, to the memory 4, the estimated region of interest A which is enlarged at a ratio corresponding to the ratio of reduction by the image size reduction unit 5b both horizontally (x axis) and vertically (y axis) so as to be associated with the image F1 of before reduction obtained by the obtaining unit 5a (step S11), and the region of interest estimation processing is ended.

When it is determined at step S6 that the degree of pixel value coincidence with the target pixels of the comparison determination in the tracking region is less than the threshold value (step S6: NO), the region of interest estimation processing is also ended.

As described above, according to the imaging apparatus 100 of the present embodiment, with respect to a peripheral region of at least one pixel in the four corners of the image, by tracking a pixel similar to the at least one pixel, the image having a low degree of attention from the user which is situated closer to the edge in the composition (angle of view), that is, for example, an region outside sight can be identified.

Then, in the image to be processed, the region other than the region consisting of the pixels tracked by the pixel tracking unit 5d is estimated to be the region of interest A. That is, in the image, the region consisting the tracked pixels, that is, the region consisting of pixels situated closer to the edge in the composition is highly likely an outside sight and has a low degree of attention from the user such as the sky or the ground. Thereby, the region other than the tracked pixels in the image can be estimated to be the region of interest A having a high degree of attention from the user, and the region of interest (for example, in FIG. 5B, mainly the region where the buffalo exists) having a high degree of attention from the user in the image can be detected in consideration of the composition of the subject image.

Moreover, from at least one pixel in the four corners of the image, a pixel similar to the at least one pixel in the image F2 is tracked. Specifically, since pixels adjacent to at least one pixel in the four corners of the image are set as the tracking range and pixels adjacent to the pixel tracked as the pixel similar to at least one pixel in the four corners in the tracking range are successively tracked as the new tracking range, the region consisting of pixels closer to the edge and having a low degree of attention from the user can be appropriately identified while the region (region of interest A) having a high degree of attention from the user in the composition is left, so that the accuracy of detection of the region of interest A from the image can be improved.

Further, since the pixel whose degree of pixel value coincidence with at least one pixel in the four corners of the image is determined to be not less than the threshold value is tracked as the pixel similar to the at least one pixel in the four corners, a pixel of a color similar to that of the pixel in the four corners of the image can be tracked, so that the region consisting of pixels situated closer to the edge in the composition and having a low degree of attention from the user can be appropriately identified.

Moreover, the reduced-size image F2 of the image F1 obtained by the obtaining unit 5a is generated and the reduced-size image F2 can be set as the image, so that the speed of the tracking of the pixel similar to the pixels in the four corners of the reduced-size image F2 and the estimation of the region of interest A having a high degree of attention from the user can be enhanced.

The present invention is not limited to the above-described embodiment, but various improvements and design changes may be made without departing from the purport of the present invention.

For example, while pixels adjacent to each of the pixels in the four corners of the image (reduced-size image F2) are set as the tracking range and pixels adjacent to the pixel tracked as the pixel similar to the pixels in the four corners in the tracking range is set as the new tracking range, the tracking range and new tracking range setting methods are not limited thereto but may be arbitrarily changed as appropriate as long as the pixel similar to the pixels in the four corners of the image (reduced-size image F2) is tracked.

While in the above-described embodiment, the reduced-size image F2 which is a reduced-size image of the image F1 obtained by the obtaining unit 5a is used as the target image of the estimation of the region of interest A, whether to generate the reduced-size image F2 or not, the ratio (degree) of reduction and the like may be arbitrarily changed as appropriate according to the performance of the apparatus.

The structure of the imaging apparatus 100 shown in the above-described embodiment is merely an example and the present invention is not limited thereto. That is, while the imaging apparatus 100 is shown as an example of the image processing apparatus, the present invention is not limited thereto. For example, the image processing apparatus may be one in which the image is captured by an imaging apparatus different from the imaging apparatus 100, the image data transferred from this imaging apparatus are obtained and the region of interest A is detected.

In addition, while in the above-described embodiment, the functions as the capturing unit, the specifying unit, the tracking unit and the estimating unit are implemented by the obtaining unit 5a, the pixel specifying unit 5c, the pixel tracking unit 5d and the ROI detector 5f of the image processor 5, respectively, under the control of the controller 10, the present invention is not limited thereto. They may be implemented by executing a predetermined program or the like by the CPU of the controller 10.

That is, a program including an obtaining routine, a specifying routine, a tracking routine and an estimating routine is stored in a program memory (not shown) for storing programs. The CPU of the controller 10 may be made to function, by the obtaining routine, as the capturing unit for capturing an image. Moreover, the CPU of the controller 10 may be made to function, by the specifying routine, as the specifying unit for specifying at least one pixel on the edge of the image captured by the capturing unit. Moreover, the CPU of the controller 10 may be made to function, by the tracking routine, as the tracking unit for tracking pixels that are similar to the at least one pixel, among peripheral pixels around the at least one pixel.

Moreover, the CPU of the controller 10 may be made to function, by the estimating routine, as the estimating unit for estimating, as a region of interest A, a region other than a region consisting of the pixels tracked by the tracking unit.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An image processing apparatus comprising:
an obtaining unit configured to obtain an image;
a specifying unit configured to specify at least one pixel on an edge of the image as a tracking starting pixel;
a tracking unit configured to set peripheral pixels around the at least one pixel as a tracking range and sequentially track pixels that are similar to the at least one pixel from the tracking range;
an estimating unit configured to estimate, as a region of interest, a region other than a region consisting of the pixels tracked by the tracking unit;
a first determining unit configured to determine whether or not a degree of coincidence between a pixel value of the at least one pixel and pixel values of the peripheral pixels is not less than a first threshold value; and
a second determining unit configured to determine whether or not a difference between a pixel value of the tracking starting pixel specified by the specifying unit and the pixel values of the peripheral pixels is less than a second threshold value;
wherein when the first determining unit determines that the degree of coincidence is not less than the first threshold value and the second determining unit determines that the difference is less than the second threshold value, the tracking unit determines that one of the peripheral pixels is similar to the at least one pixel, and tracks said one of the peripheral pixels.

2. The apparatus according to claim 1, wherein the at least one pixel is on at least one corner of the image.

3. The apparatus according to claim 1, further comprising:
an image size reduction unit configured to generate a reduced-size image of the image;
wherein the specifying unit is configured to specify at least one pixel on an edge of the reduced-size image.

4. An image processing method, the method comprising:
an obtaining step for obtaining an image;
a specifying step for specifying at least one pixel on an edge of the image as a tracking starting pixel;
a tracking step for setting peripheral pixels around the at least one pixel as a tracking range and sequentially tracking pixels that are similar to the at least one pixel from the tracking range;
an estimating step for estimating, as a region of interest, a region other than a region consisting of the tracked pixels;
a first determining step for determining whether or not a degree of coincidence between a pixel value of the at least one pixel and pixel values of the peripheral pixels is not less than a first threshold value; and
a second determining step for determining whether or not a difference between a pixel value of the tracking starting pixel specified by the specifying step and the pixel values of the peripheral pixels is less than a second threshold value;
wherein the tracking step determines that one of the peripheral pixels is similar to the at least one pixel, and tracks said one of the peripheral pixels, when the first determining step determines that the degree of coincidence is not less than the first threshold value and the second determining step determines that the difference is less than the second threshold value.

5. A non-transitory computer-readable storage medium having a program stored thereon which controls a computer included in an image processing apparatus to function as units comprising:
an obtaining unit configured to obtain an image;
a specifying unit configured to specify at least one pixel on an edge of the image as a tracking starting pixel;
a tracking unit configured to set peripheral pixels around the at least one pixel as a tracking range and sequentially track pixels that are similar to the at least one pixel from the tracking range;
an estimating unit configured to estimate, as a region of interest, a region other than a region consisting of the pixels tracked by the tracking unit;
a first determining unit configured to determine whether or not a degree of coincidence between a pixel value of the at least one pixel and pixel values of the peripheral pixels is not less than a first threshold value; and a second determining unit configured to determine whether or not a difference between a pixel value of the tracking starting pixel specified by the specifying unit and the pixel values of the peripheral pixels is less than a second threshold value;

wherein when the first determining unit determines that the degree of coincidence is not less than the first threshold value and the second determining unit determines that the difference is less than the second threshold value, the tracking unit determines that one of the peripheral pixels is similar to the at least one pixel, and tracks said one of the peripheral pixels.

* * * * *